United States Patent [19]
Yamamoto et al.

[11] Patent Number: 5,734,534
[45] Date of Patent: Mar. 31, 1998

[54] MAGNETIC HEAD

[75] Inventors: Tetsuya Yamamoto; Hiroyuki Ohmori, both of Kanagawa; Yasunari Sugiyama, Tokyo; Mitsuharu Shouji, Kanagawa, all of Japan

[73] Assignee: Sony Corporation, Tokyo, Japan

[21] Appl. No.: 762,721

[22] Filed: Dec. 10, 1996

Related U.S. Application Data

[63] Continuation of Ser. No. 361,654, Dec. 22, 1994, abandoned.

[30] Foreign Application Priority Data

Dec. 29, 1993 [JP] Japan ................... 5-351628

[51] Int. Cl.$^6$ ................... G11B 5/17
[52] U.S. Cl. ................... 360/123
[58] Field of Search ................... 29/603; 360/123, 360/125, 126, 127

[56] References Cited

U.S. PATENT DOCUMENTS

| | | | |
|---|---|---|---|
| 4,376,337 | 3/1983 | Kobayasi et al. | 29/603 |
| 4,532,620 | 7/1985 | Matsuda et al. | 369/136 |
| 4,738,021 | 4/1988 | McClure | 29/603 |
| 4,774,755 | 10/1988 | Yoshisato et al. | 29/603 |

FOREIGN PATENT DOCUMENTS

| | | | |
|---|---|---|---|
| 0 413 348 | 2/1991 | European Pat. Off. | |
| 573036218 | 5/1982 | Germany | 360/125 |
| 56-44119 | 4/1981 | Japan | 360/123 |
| 63-39114 | 2/1988 | Japan | |
| 1285009 | 11/1989 | Japan | 360/125 |
| 1-317216 | 12/1989 | Japan | |
| 2-27508 | 1/1990 | Japan | |
| 3-248305 | 11/1991 | Japan | |
| 4-38606 | 2/1992 | Japan | 360/125 |
| 563 654 | 6/1975 | Switzerland | |

OTHER PUBLICATIONS

IBM Technical Disclosure Bulletin "Forming Windings on Cores", Brickl et al. vol. 11, No. 11, Apr. 1969.

*Primary Examiner*—Stuart S. Levy
*Assistant Examiner*—William J. Klimowicz
*Attorney, Agent, or Firm*—Hill, Steadman & Simpson

[57] ABSTRACT

A magnetic head is made by fixing together two head halves 9 and 39. Recesses 10 and 40 are formed in glass layers 4 and 34 on the substrates 1 and 31 respectively of the head halves, and spiral coil patterns 11 and 41 are formed in the recesses. Apart from their inner end portions 11a and 41a the coil patterns are covered by insulating protective films 23 and 53. A plurality of sloping surfaces 4b, 34b are formed on the glass layers 4 and 34 at the locations of the inner end portions of the coil patterns, whereby a plurality of projections 4a, 34a are formed. The angle of slope θ of the sloping surfaces is above 30° and below 90°. The coil patterns 11 and 41 comprise copper plating layers 19 and 39; because the coil pattern inner end portions lie on the projections 4a, 34a their surfaces are high and exposed at the surfaces of the insulating protective films 23, 53, and gold films 16 and 46 are formed thereon. These gold films connect to each other and connect the coil patterns 11 and 41 to form one coil.

23 Claims, 28 Drawing Sheets

FIG. 19A
FIG. 19B
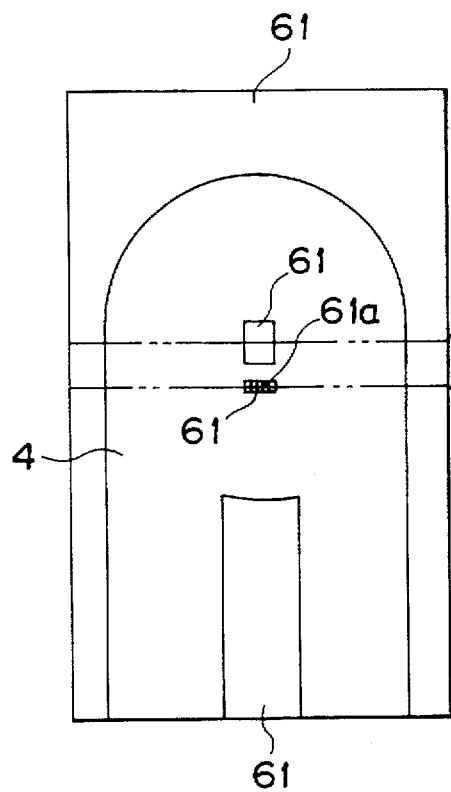
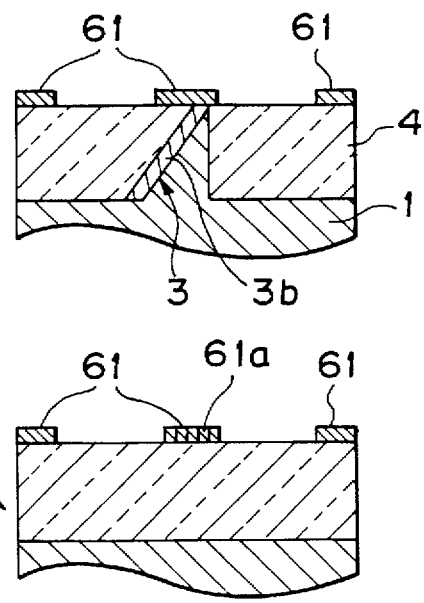

FIG. 20A
FIG. 20B
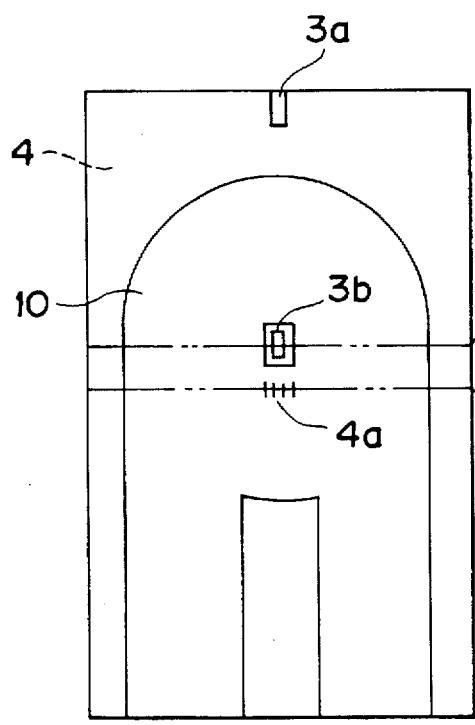
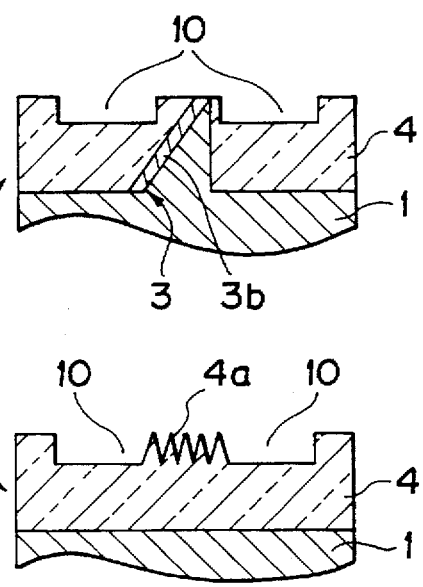

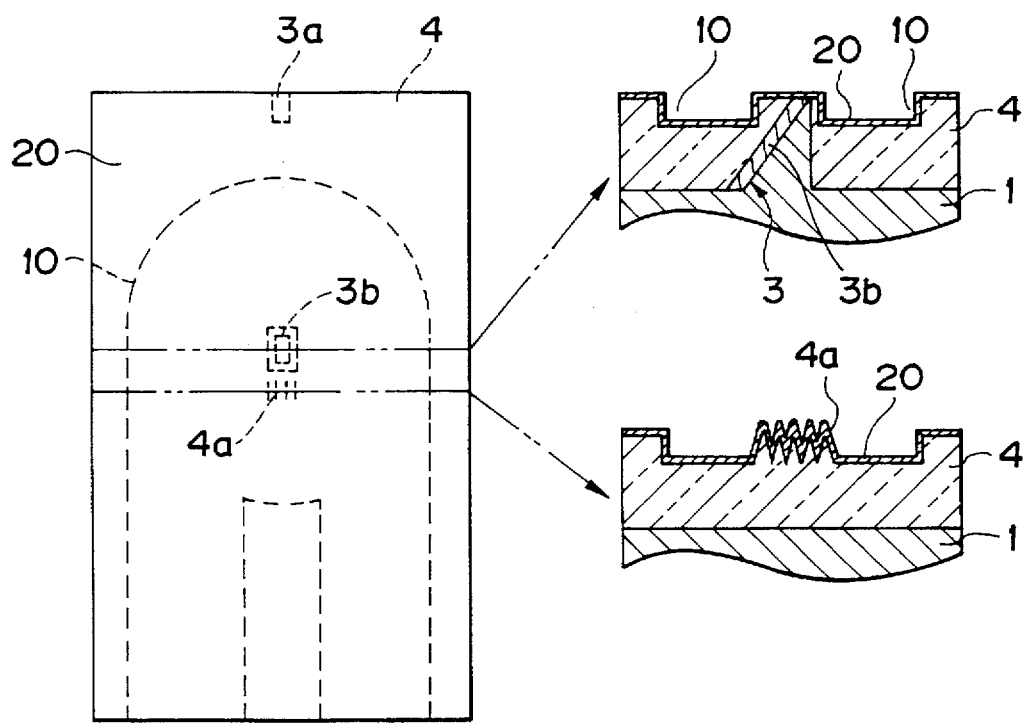

FIG.23A
FIG.23B
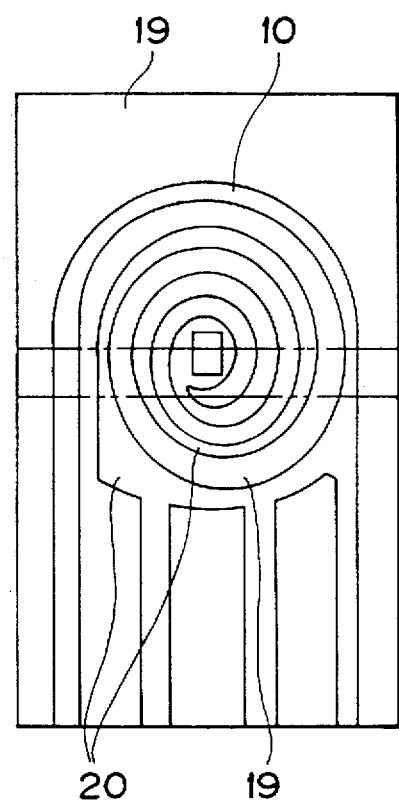
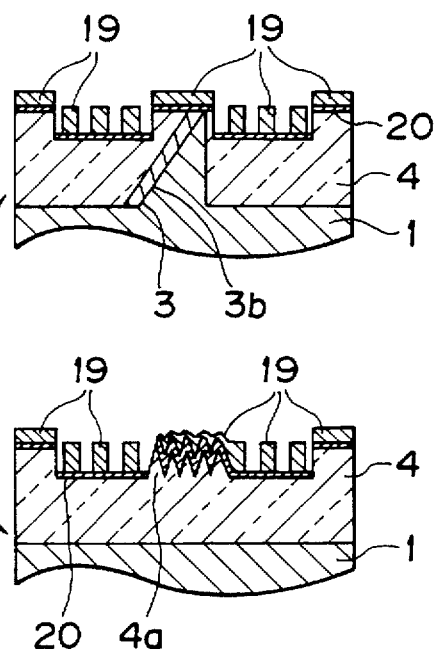

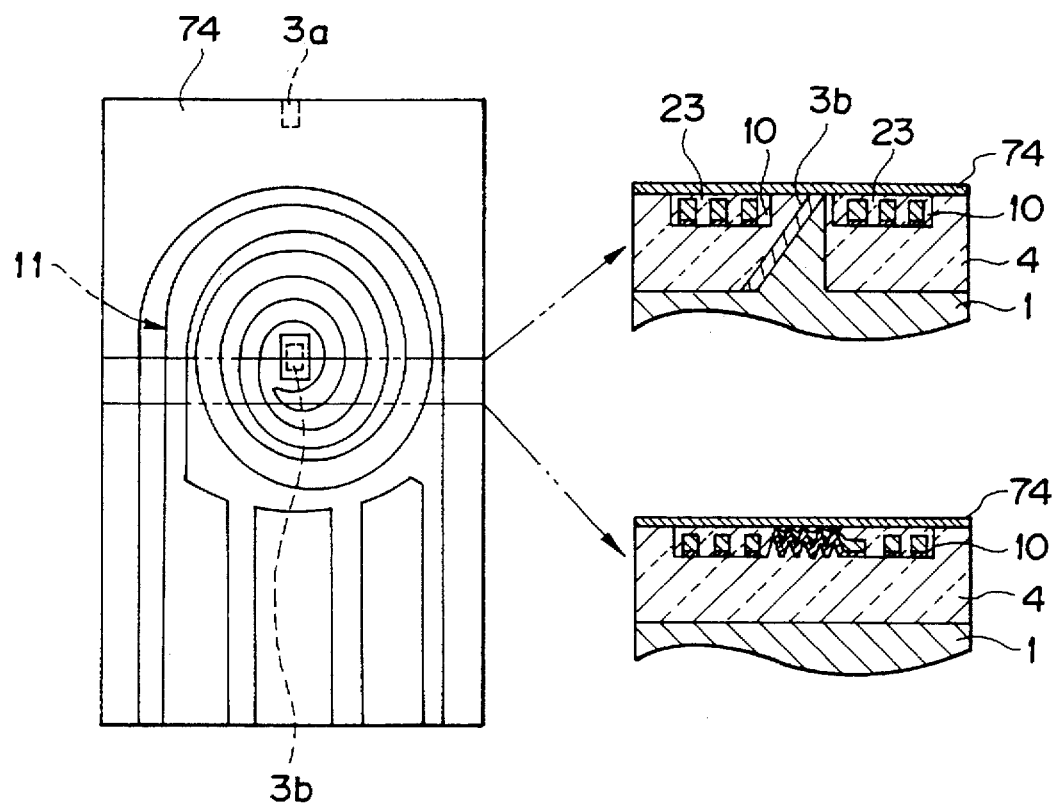

MAGNETIC HEAD

This is a continuation of application Ser. No. 08/361,654, filed Dec. 22, 1994, now abandoned.

BACKGROUND OF THE INVENTION

This invention relates to a magnetic head and a method of manufacturing the same, and for example to a magnetic head suitable for a video tape recorder or a magnetic disk apparatus and a method of manufacturing the same.

In magnetic recording and reproducing devices such as for example video tape recorders (VTRs), digital recording, wherein signals are digitalized before being recorded in order to improve the picture quality, is being advanced, and recording densities and recording frequencies are being increased to realize this digital recording.

As higher densities and frequencies of magnetic recording are adopted, high output and low noise at high frequencies is required of magnetic heads used for recording and reproduction. For example, with a so-called compound metal-in-gap head which is widely used as a magnetic head for VTRs and comprises a ferrite material coated with a metallic magnetic film and wire-wound, the inductance of the head is high and because of output reduction due to the inductance the output in high frequency regions is low and consequently it is difficult to satisfactorily perform digital image recording, which requires high frequency and high density, with this type of head.

In view of this, the use of so-called thin film magnetic heads made by thin film forming processes as magnetic heads capable of handling high frequencies has been studied.

A thin film magnetic head is made by forming a spiral coil by a thin film forming method such as photolithography on each of two ceramic substrates and then joining the two substrates together. At the time of this joining, end portions of the spiral thin film coils are electrically connected together to form one coil. It is necessary that regions of the thin film coils other than the above-mentioned connection portions at their ends (hereinafter called contact electrodes) be insulated by being kept a certain distance away from the surfaces at which the substrates are joined and thereby from each other.

Because of this, a troublesome processing step of lowering the upper surface of the regions of the thin film coils other than the contact electrodes by ion milling or ion etching or raising the contact electrode portions of thin film coils formed low by a predetermined dimension in advance is necessary. Also, the above-mentioned connection tends to be uncertain.

Alternatively, it is possible to form a thin film coil on just one of the substrates and form an interconnector connected to a terminal on the other substrate and electrically connect the thin film coil and the interconnector; however, the same kinds of problem as those mentioned above exist in this case also.

This invention was devised in view of the problems described above, and an object of the invention is to provide a magnetic head of which the thin film coil can be formed easily and in which the electrical connection of the coil is certain and highly reliable.

The invention is a magnetic head comprising a mutually facing pair of bases wherein a thin film coil is formed on at least one of the bases and at a base position corresponding to an electrical connection portion of the thin film coil existing between the two bases there are formed a plurality of projecting surfaces sloping in directions intersecting with the surface of the base on which the thin film coil is formed.

In the invention, a plurality of projections of width 1 to 10 μm are preferably formed at a spacing of 1 to 10 μm by the plurality of projecting surfaces sloping in directions intersecting with the surface on which the thin film coil is formed.

Also, in this invention, regions of the thin film coil other than the connection portion are preferably covered by an insulating film.

Also, in this invention, regions of the thin film coil other than the connection portion are preferably disposed in a recess formed in the respective base.

Further, in this invention, preferably a thin film coil is formed on each of the bases and these thin film coils are electrically connected to constitute one coil.

This invention also provides a method for manufacturing the above-mentioned magnetic head wherein at a base position corresponding to the electrical connection portion of the thin film coil existing between the two bases a plurality of surfaces sloping in directions intersecting with the surface on which is formed the thin film coil are formed using a mask having a plurality of apertures.

BRIEF DESCRIPTION OF THE DRAWINGS

FIG. 1(a) is a sectional view of a coil pattern portion, and FIG. 1(b) is an enlarged view of the portion $I_b$ in FIG. 1(a);

FIG. 6(a) shows a case where the slit spacing is large, FIG. 6(b) shows a case where the slit spacing is small, and FIG. 6(c) shows a case where the slit spacing is still smaller;

FIG. 8(a) is a sectional view on the line $VIII_a$—$VIII_a$ in FIG. 7, and FIG. 8(b) is a sectional view on the line $VIII_b$—$VIII_b$ in FIG. 7;

3

Figure 15:
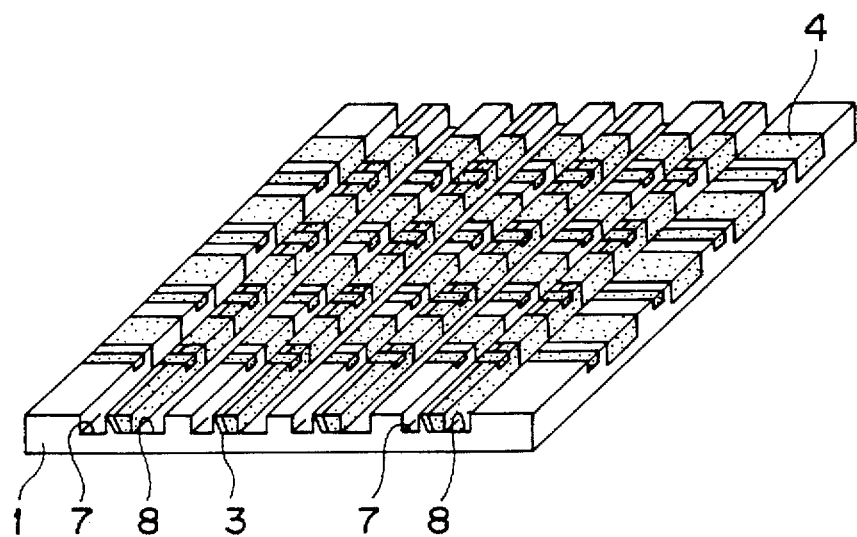
Figure 16:
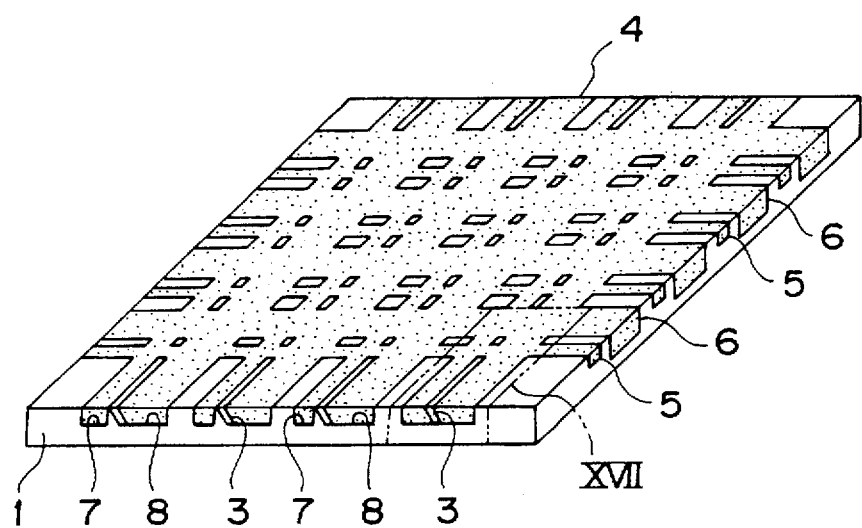
Figure 17:
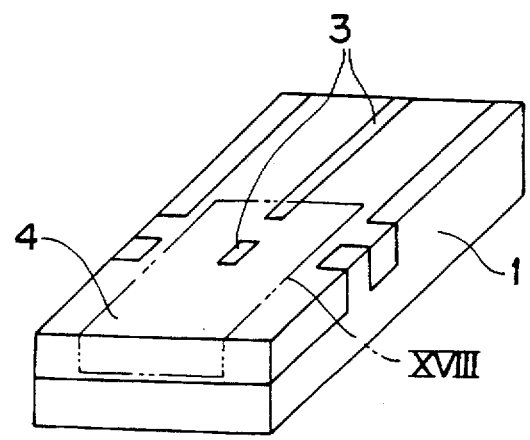
Figure 18A:
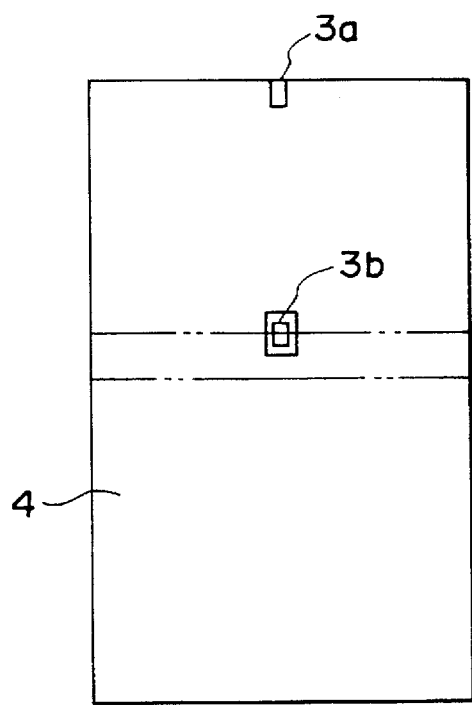
Figure 18B:
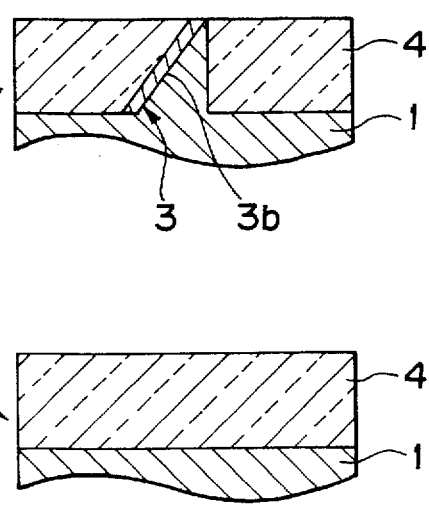
Figure 22A:
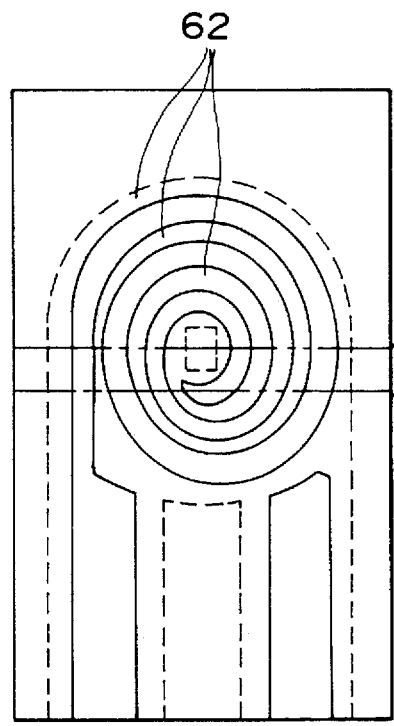
Figure 22B:
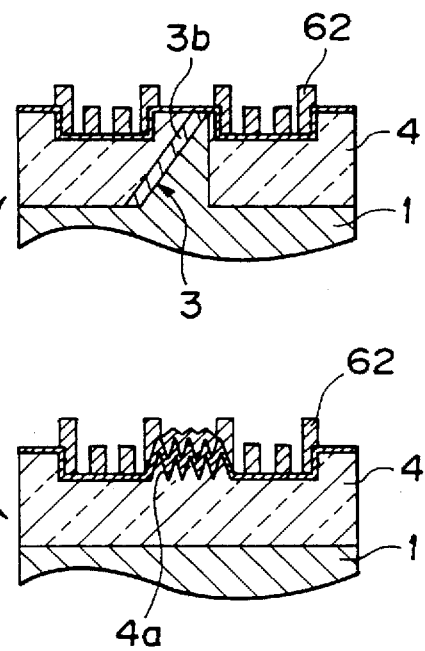
Figures 24A, 24B:
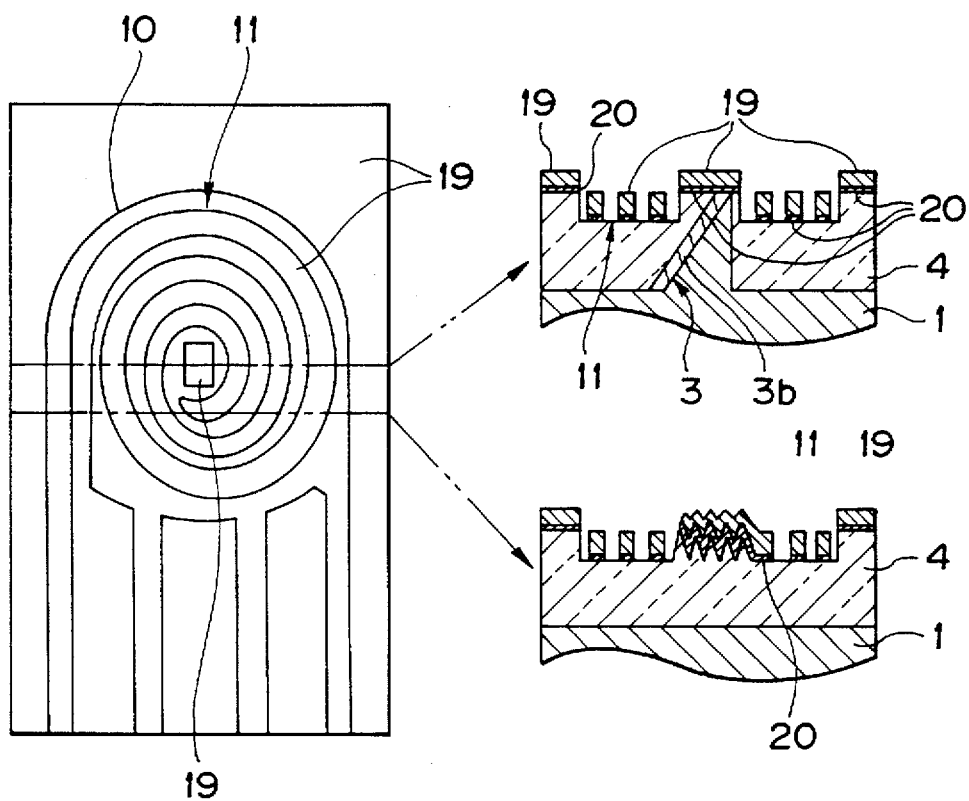
Figure 25A:
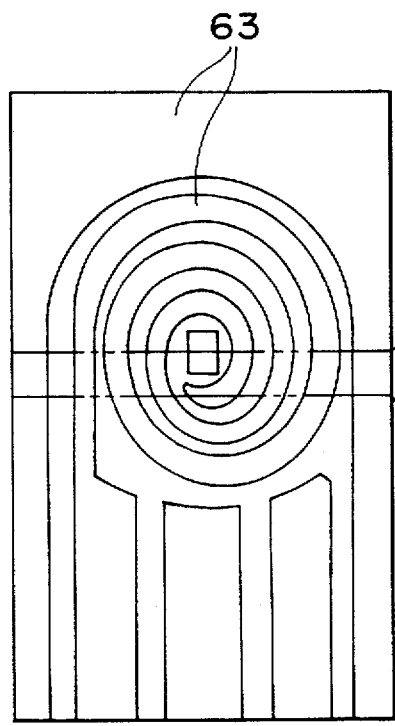
Figure 25B:
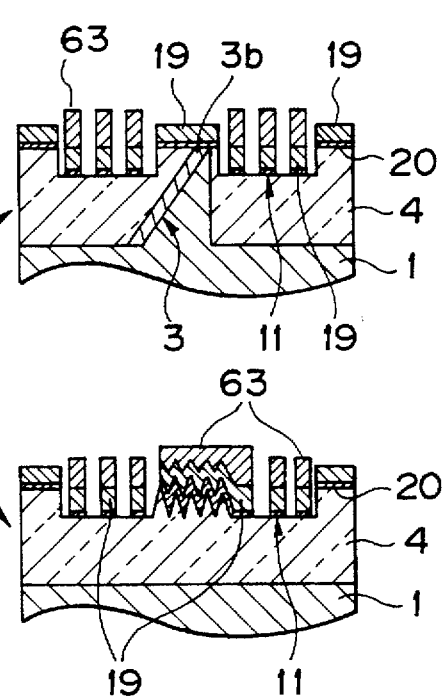
Figure 26A:
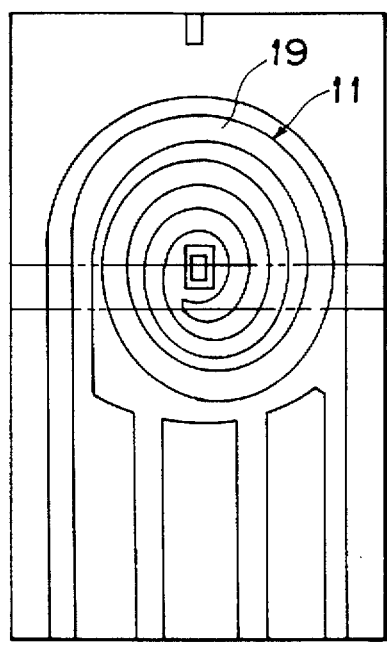
Figure 26B:
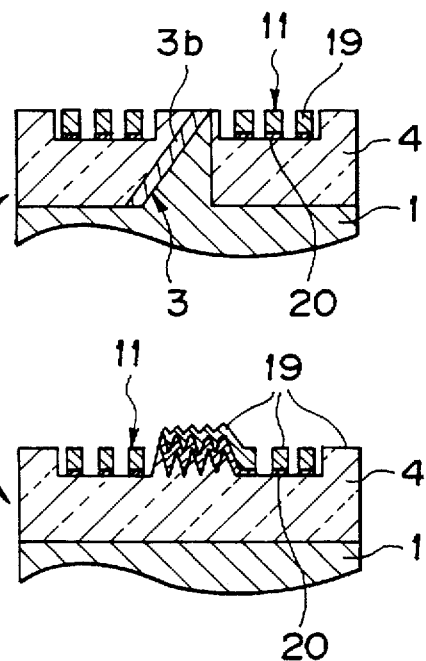
Figures 27A, 27B:
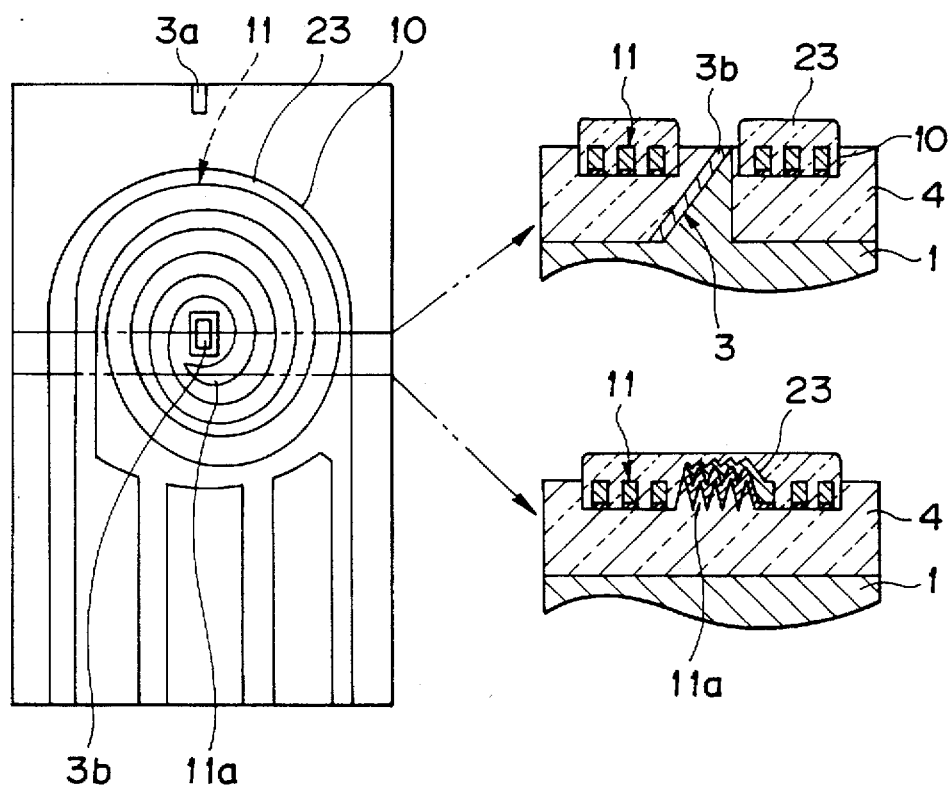
Figures 28A, 28B:
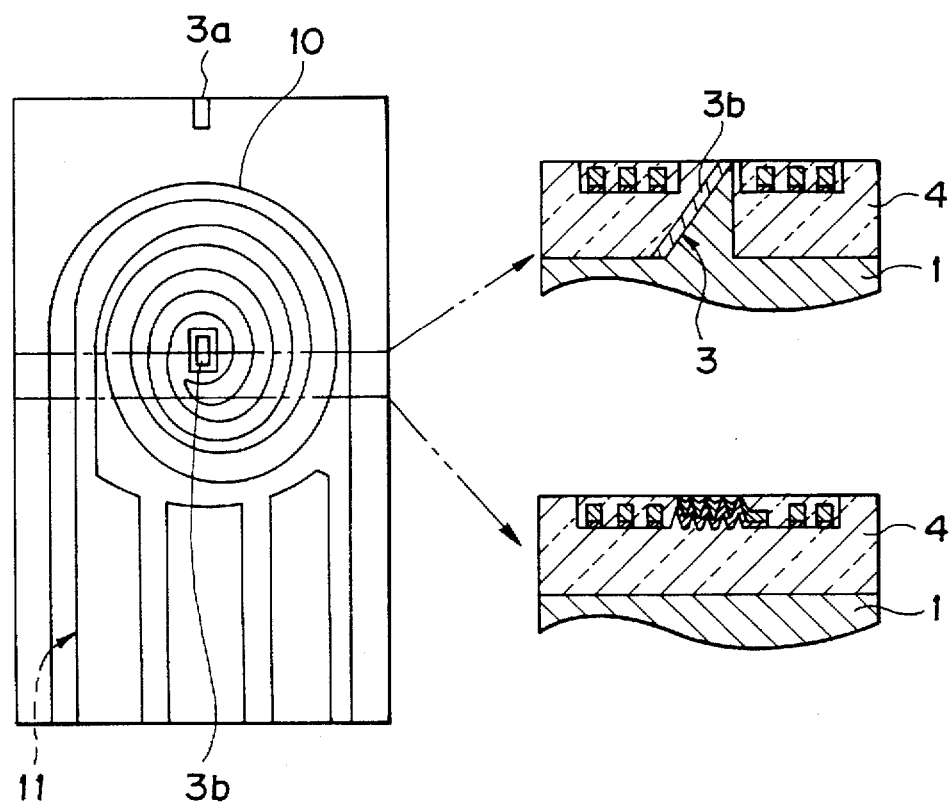
Figure 30A:
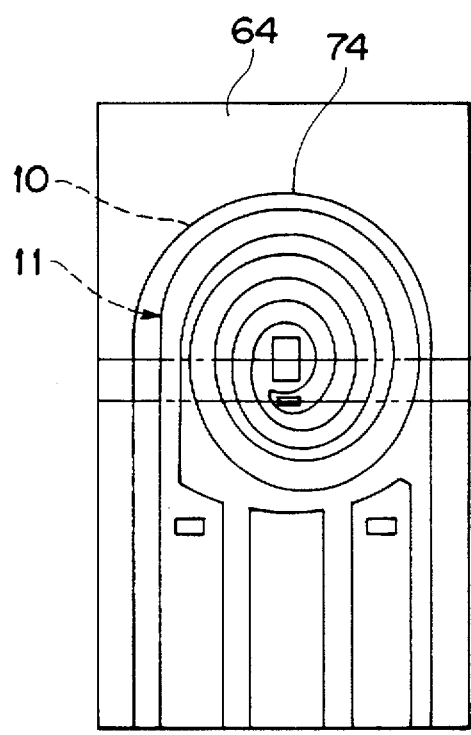
Figure 30B:
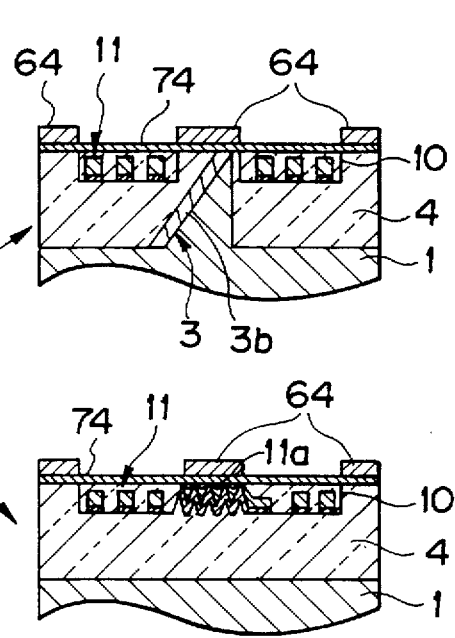
Figure 31A:
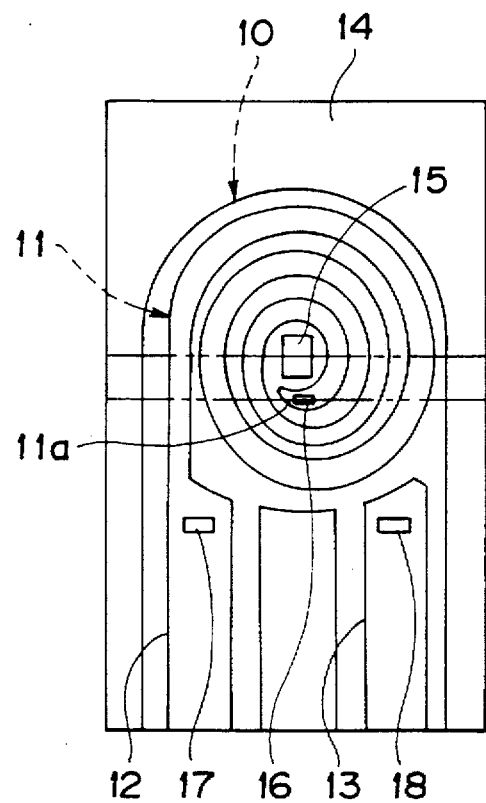
Figure 31B:
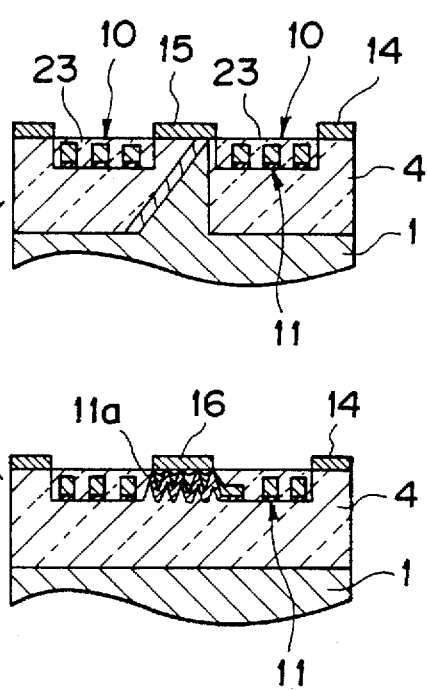
Figure 32:
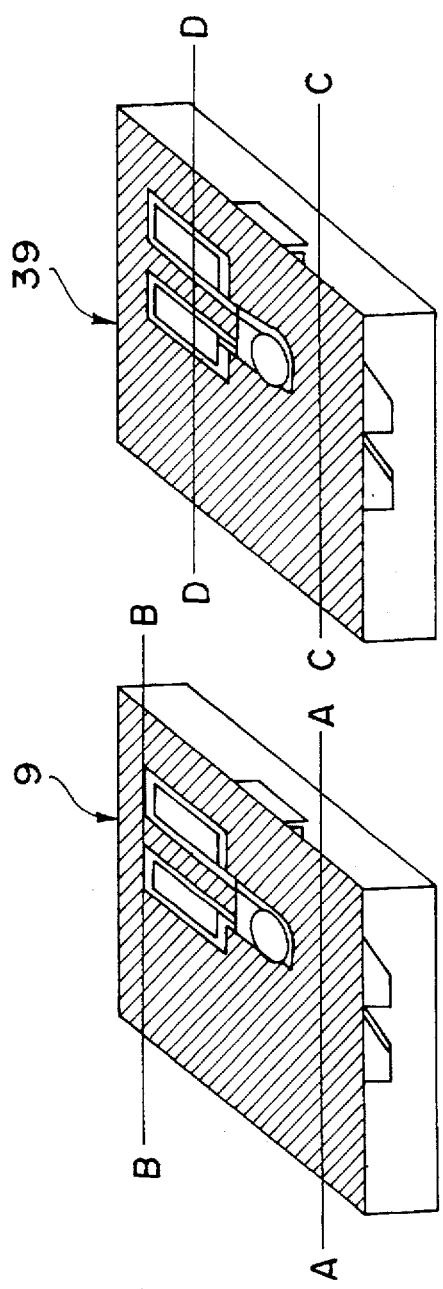
Figure 33:
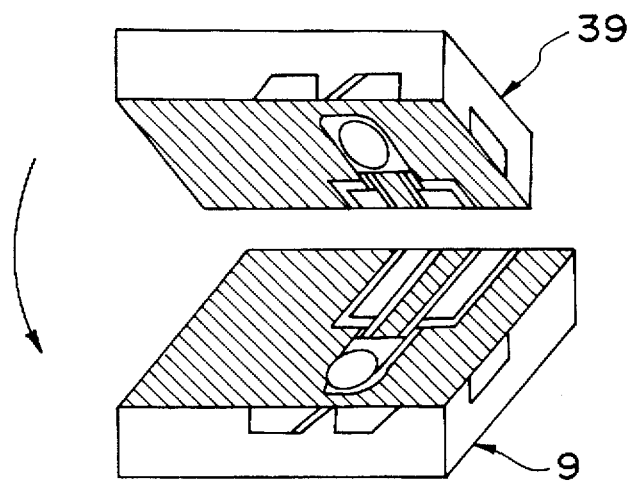
Figures 34A, 34B:
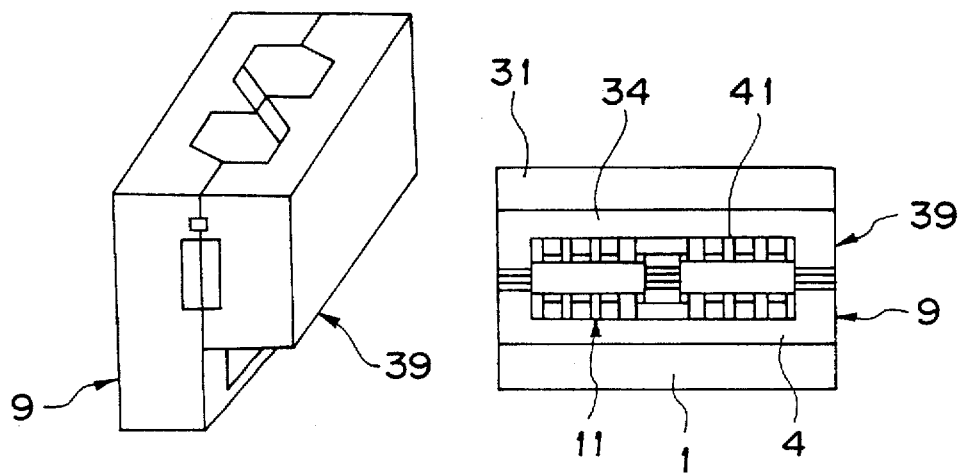
Figure 35:
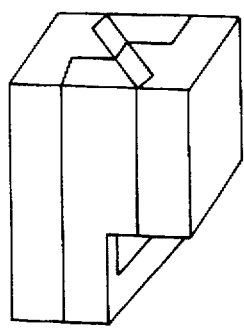
Figure 36:
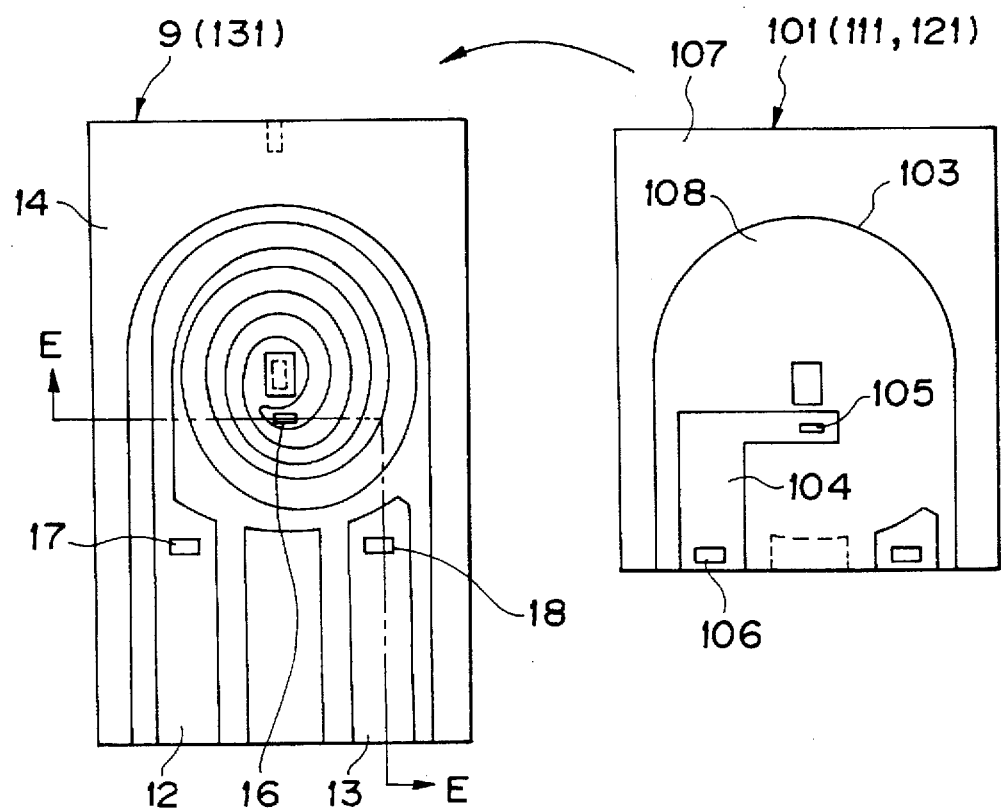
Figure 37:
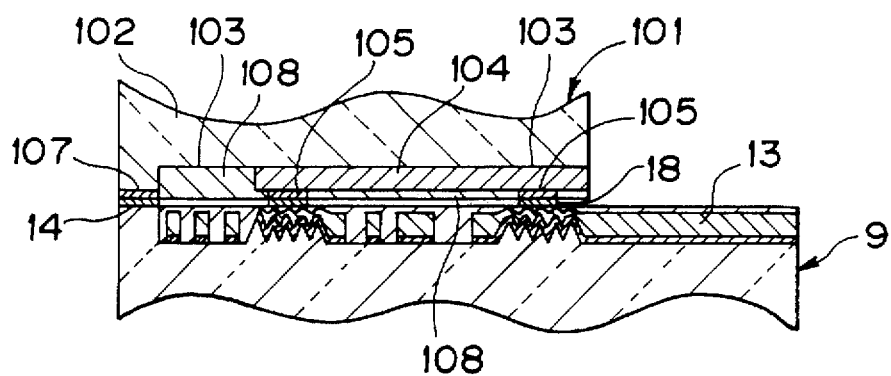
Figure 38:
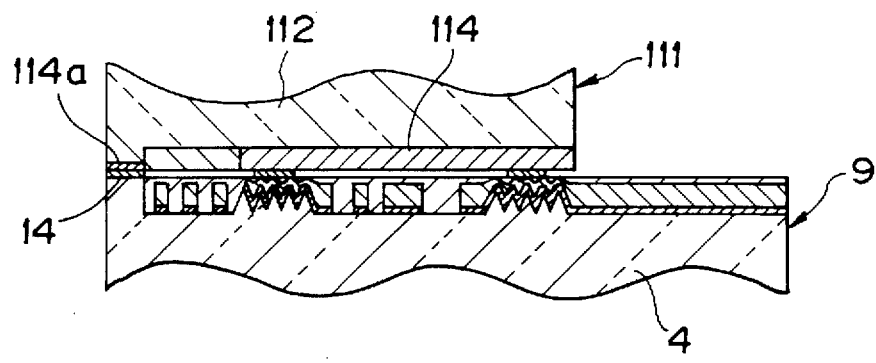
Figure 39:
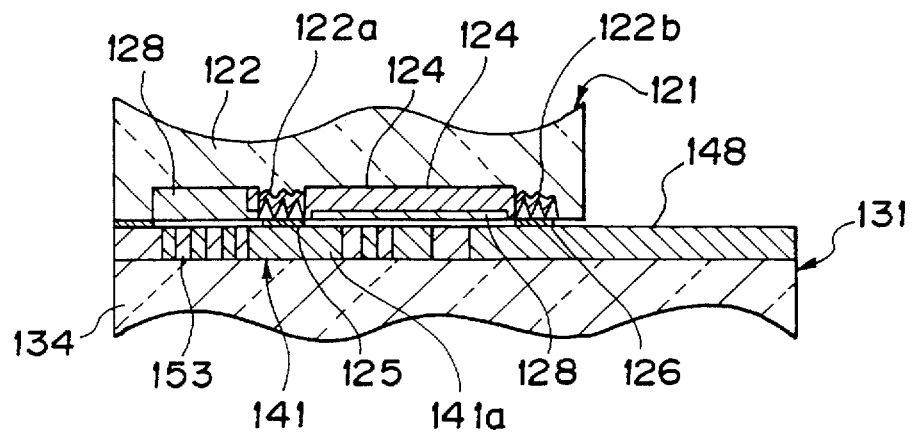

FIG. 15 is a perspective view illustrating fourth and fifth groove-making steps carried out on the substrate;

FIG. 16 is a perspective view illustrating a glass filling and flattening step:

FIG. 17 is an enlarged view of the portion XVII (an unfinished head half) in FIG. 16;

FIG. 18(a) is a plan view and FIG. 18(b) a sectional view of the unfinished head half of FIG. 17;

FIG. 19(a) is a plan view and FIG. 19(b) a sectional view of the unfinished head half provided with a photoresist on the glass layer;

FIG. 20(a) is a plan view and FIG. 20(b) a sectional view of the unfinished head half with a recess provided in the glass layer;

FIG. 21(a) is a plan view and FIG. 21(b) a sectional view of the unfinished head half provided with a copper plating base film;

FIG. 22(a) is a plan view and FIG. 22(b) a sectional view of the unfinished head half provided with a photoresist on the base film;

FIG. 23(a) is a plan view and FIG. 23(b) a sectional view of the unfinished head half provided with a copper plating film;

FIG. 24(a) is a plan view and FIG. 24(b) a sectional view of the unfinished head half on which a coil pattern has been formed by removing the base film on which there is no copper plating layer;

FIG. 25(a) is a plan view and FIG. 25(b) a sectional view of the unfinished head half provided with a photoresist on the copper plating layer;

FIG. 26(a) is a plan view and FIG. 26(b) a sectional view of the unfinished head half after unnecessary portions of the copper plating layer have been removed;

FIG. 27(a) is a plan view and FIG. 27(b) a sectional view of the unfinished head half provided with an insulating protective film in the recess;

FIG. 28(a) is a plan view and FIG. 28(b) a sectional view of the unfinished head half after its surface has been flattened;

FIG. 29(a) is a plan view and FIG. 29(b) a sectional view of the unfinished head half with a gold film formed on its surface;

FIG. 30(a) is a plan view and FIG. 30(b) a sectional view of the unfinished head half with a photoresist formed on the gold film;

FIG. 31(a) is a plan view and FIG. 31(b) a sectional view of the unfinished head half after the gold film has been patterned;

FIG. 32 is a perspective view showing lines along which a pair of unfinished head halves are cut;

FIG. 33 is a perspective view showing how a pair of head halves are fixed together;

FIG. 34(a) is a perspective view and FIG. 34(b) a sectional view of a pair of head halves fixed together;

FIG. 35 is a perspective view of a magnetic head after unnecessary portions have been removed;

FIG. 36 is a plan view of a pair of head halves according to another preferred embodiment;

FIG. 37 is a sectional view along the line E—E in FIG. 36;

FIG. 38 is a sectional view similar to FIG. 37 of a pair of head halves which have been fixed together according to another preferred embodiment; and FIG. 39 is a sectional view similar to FIG. 37 of a pair of head halves which have been fixed together according to a further preferred embodiment.

4

DETAILED DESCRIPTION OF THE PREFERRED EMBODIMENTS

A preferred embodiment of the invention will now be described, with reference to the accompanying drawings.

Figure 7:
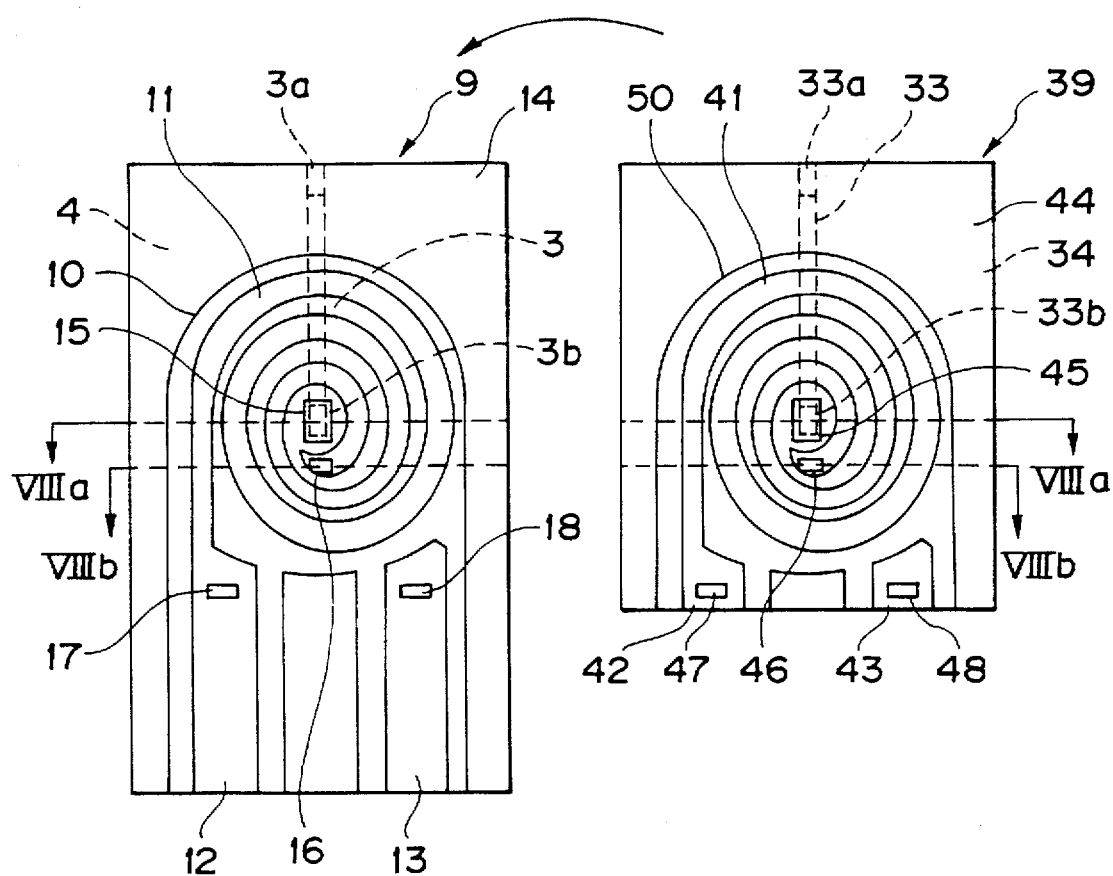
FIG. 7 is a plan view of a pair of head halves.
Figure 8A:
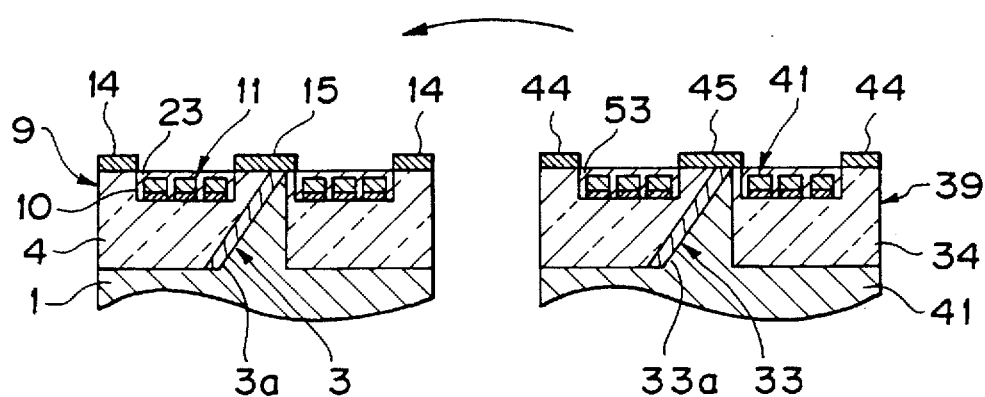
FIGS. 8(a) and 8(b) show the cross-sectional structure of a pair of head halves.
Figure 8B:
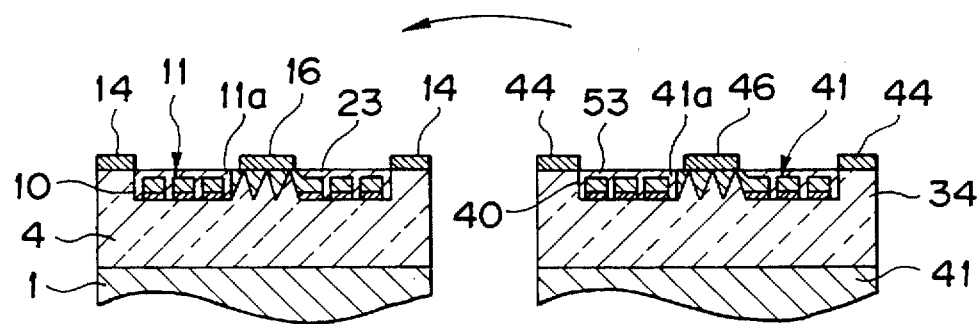

The magnetic head of this preferred embodiment is made by fixing together a pair of head halves each comprising a substrate on which a spiral coil pattern is formed by thin film forming methods. FIG. 7 is an enlarged plan view of these head halves, FIG. 8(a) is a sectional view on the line $VIII_a$—$VIII_a$ in FIG. 7, and FIG. 8(b) is a sectional view on the line $VIII_b$—$VIII_b$ in FIG. 7. The magnetic head consists of a head half 9 fixed as shown by arrows in the drawings to a head half 39 of substantially the same shape as the head half 9.

The head half 9 has the following construction: A recess 10 is provided in the surface of a layer of glass 4 on a ceramic substrate 1, and a coil pattern 11 is formed on the bottom surface 10a of the recess 10 by thin film forming methods. There is a portion in the vicinity of the inner end portion 11a of the coil pattern 11 where there is no recess and a portion of a metallic magnetic film 3 which constitutes a back gap 3b is exposed at the surface of the glass 4. The metallic magnetic film 3 is buried in the glass 4 from the portion constituting the back gap 3b to one end of the substrate, and this end of the substrate forms a portion constituting a front gap 3a.

A terminal portion 12 extends from the outer end portion of the coil pattern 11 to the other end of the substrate 1, and another terminal portion 13 which is clear of the coil pattern 11 is provided in parallel with the terminal portion 12. The metallic magnetic film 3 is formed on a sloping surface of a groove which will be discussed later provided in the substrate.

A gold film 14 is adhered to the glass to the outside of the recess 10, a gold film 15 to the back gap portion 3b of the metallic magnetic film 3, a gold film 16 to the inner end portion 11a of the coil pattern 11, a gold film 17 to the portion of the terminal portion 12 to which the coil pattern 11 is connected, and a gold film 18 to the inner end portion of the terminal portion 13. The coil pattern 11 is covered by an insulating protective film 23 filled into the recess 10. The inner end portion 11a of the coil pattern is exposed at the surface of the insulating protective film 23, and the gold film 16 is adhered to this exposed inner end portion 11a.

The head half 39 is provided in place of the terminal portions 12 and 13 with connection portions 42 and 43 (shorter than the terminal portions 12 and 13) for connection to the terminal portions 12 and 13, and the head half 39 is shorter than the head half 9. The rest of the head half 39 is of the same construction as the head half 9. Parts constituting the head half 39 are shown with reference numerals obtained by adding 30 to the reference numerals of the corresponding parts of the head half 9.

As can be understood from FIG. 7 and FIG. 8, when the head halves 9 and 39 are fixed together the metallic magnetic films 3 and 31 form closed magnetic path, and a front gap is formed by the gold films 14 and 44 and a back gap is formed by the gold films 15 and 45. The coil patterns 11 and 41 are connected to each other through the gold films 16 and 46 and constitute a single coil.

An electric current inputted through the terminal portion 12 flows through the coil pattern 11, the gold films 16 and 46, the coil pattern 41 and the gold film 47 on the connecting portion 42 to the terminal portion 13. Current also flows in the opposite direction. The gold films 17 and 48 are not necessary for electrical connection of the coil patterns, but help to prevent unsteadiness when the head halves 9 and 39 are being fixed together.

The point in this preferred embodiment to which attention should be paid is that small projections are provided in the glass layers 4 and 34 at the positions of the inner end portions 11a and 41a of the coil patterns 11 and 41. This will now be explained in detail with reference to FIG. 1 to FIG. 6.

Figure 1A:
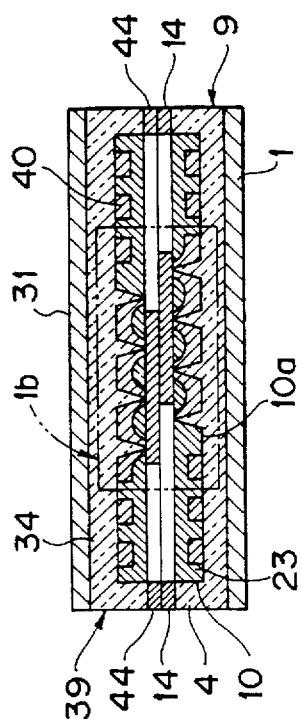
FIGS. 1(a) and 1(b) show in section the construction of a magnetic head according to a preferred embodiment of the invention.
Figure 1B:
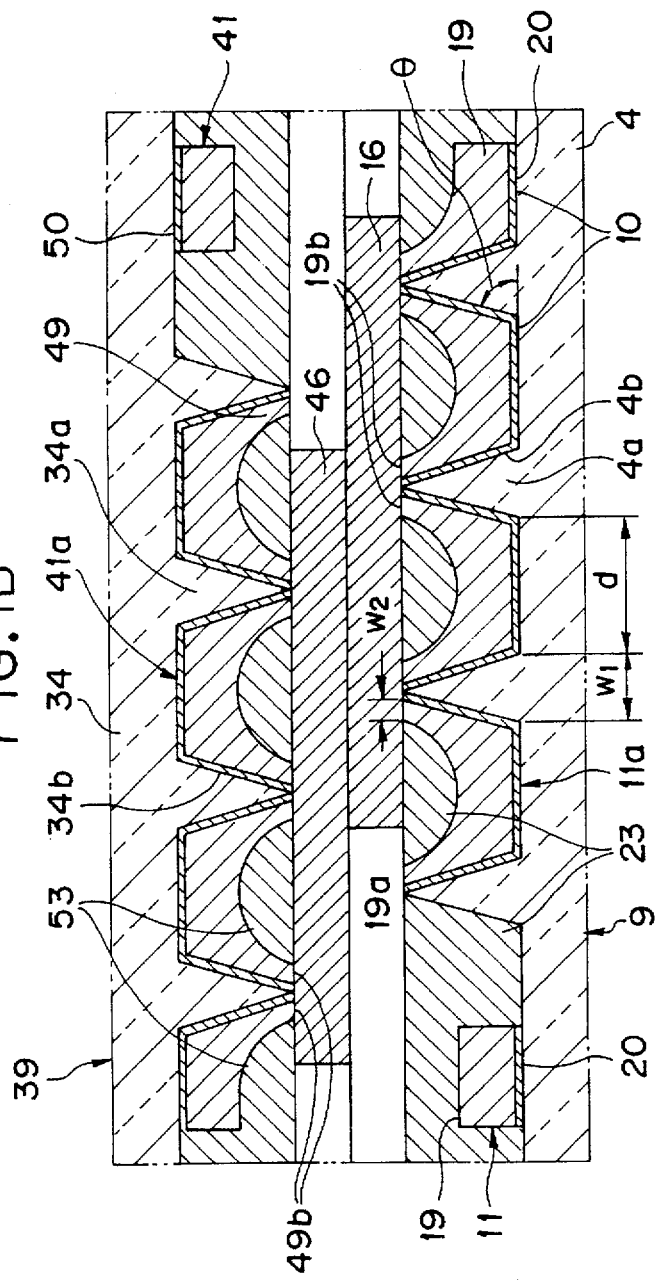

FIG. 1(a) is an enlarged sectional view corresponding to FIG. 8(b) of a magnetic head comprising a pair of head halves fixed together, and FIG. 1(b) is an enlarged view of the portion $I_b$ shown with broken lines in FIG. 1(a).

The coil pattern 11 is formed in the recess 10 formed in the glass layer 4 of the head half 9, and the coil pattern 11 excluding the inner end portion 11a thereof is covered by an insulating protective film 23. A plurality of projections 4a of triangular cross-section and width $w_1$ are formed a spacing d apart from each other in the portion of the glass layer 4 on which the inner end portion 11a of the coil pattern 11 lies.

The coil pattern 11 consists of a copper plating layer 19 formed by electroplating on a base film 20 consisting of thin films of alumina, chromium and copper superposed in this order. The copper plating layer 19a of the inner end portion 11a of the coil pattern 11 has a ridged shape following the ridges constituted by the plurality of projections 4a formed in the glass layer 4. The insulating protective film 23 is filled into the concave portions between these ridges.

The gold film 16 is adhered to the copper plating layer 19a, and the copper plating layer 19a is in contact with the gold film 16 over the width $w_2$ at a plurality of locations on its upper surface. Because at the inner end portion 11a of the coil pattern 11 the copper plating layer 19a is formed on the ridged surface formed by the projections 4a of the glass layer 4, the upper surface 19b of the copper plating layer 19a in this region is higher than the rest of the spiral portion of the copper plating layer 19.

As mentioned above, the head half 9 is fixed to the other head half 39 to form the magnetic head, and the parts constituting the head half 39 are shown in the drawings with reference numerals obtained by adding 30 to the reference numerals of the corresponding parts of the head half 9. The fixing together of the head halves 9 and 39 is carried out by the two being heated to 200° to 400° C. while being pressed together.

In this way the inner end portions 11a and 41a of the coil patterns 11 and 41 can be simply made higher than the other portions of the coil patterns, and the electrical connection between the inner end portions 11a and 41a of the coil patterns 11 and 14 through the gold films 16 and 46 is sure and its reliability is high.

If the width $w_1$ and the spacing d of the projections 4a and 34a in the glass layers are each less than 1 µm the projections are too fine and it is difficult to raise the coil pattern inner end portions 11a and 41a sufficiently, and when they each exceed 10 µm there are too few projections and the regions contacting the gold films 16 and 46 (an integer multiple of the width $w_2$) are too small; in both cases the electrical connection is not satisfactory. Making the angle θ made by the sloping surfaces 4b of the projections and the bottom surface 10a of the recess 10 greater than 30° and less than 90° is highly suitable for producing the above-mentioned effect.

Next, a method of forming the cross-sectionally triangular projections in the glass layers will be described.

Figure 5:
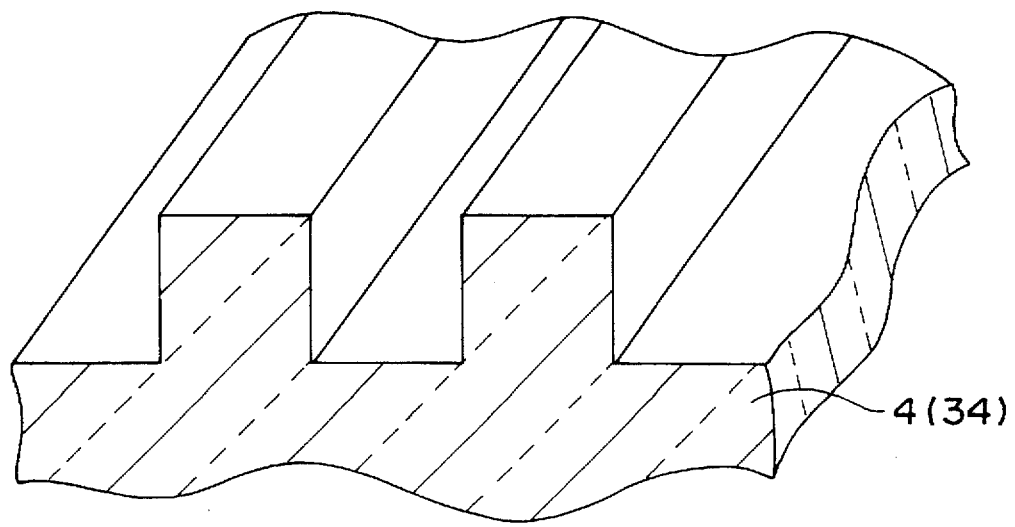
FIG. 5 is an explanatory view for explaining a step in which projections are formed on a glass layer.
Figure 6A:
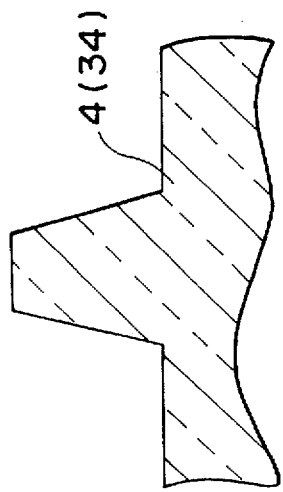
FIGS. 6(a), 6(b) and 6(c) illustrate the relationship between the spacing of slits in a resist layer and the shape of projections formed in a glass layer.
Figure 6B:
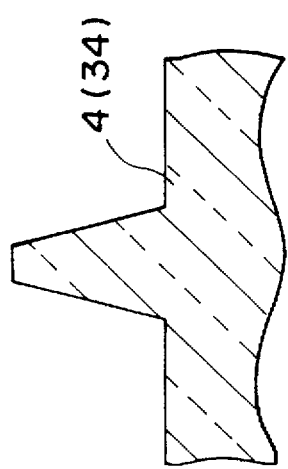
Figure 6C:
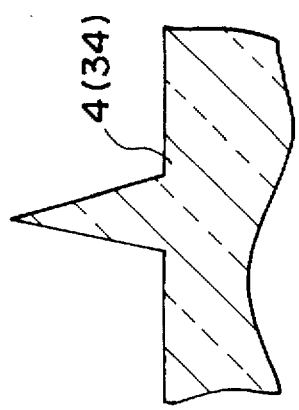

When a photoresist on the glass layer is patterned with slits and projections are formed by ion milling, ideally wall surfaces substantially perpendicular to the main surfaces of the glass layers 4, 34 as shown in FIG. 5 are formed below the slits in the photoresist. However, in practice this does not happen and wall surfaces which slope are formed, resulting in pedestal-shaped projections, as shown in FIG. 6(a). As the distance between the slits in the photoresist is made small, the projections become the narrower pedestals shown in FIG. 6(b) and then become triangular in cross-section as shown in FIG. 6(c).

Figure 2:
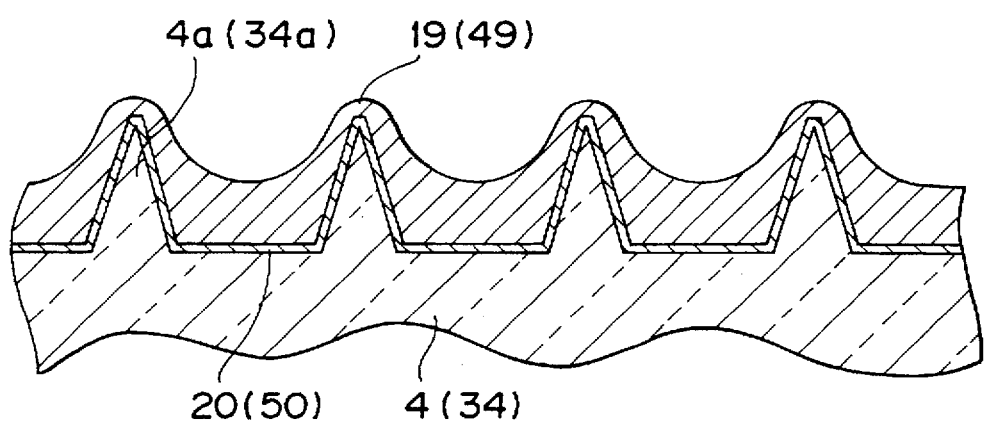
FIG. 2 is an enlarged sectional view showing a copper plating layer on an inner end portion of the coil pattern before finishing.
Figure 3:
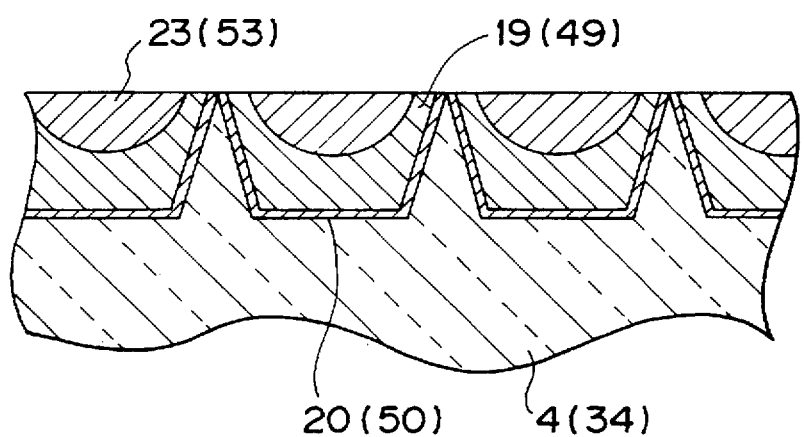
FIG. 3 is an enlarged sectional view showing the copper plating layer on the inner end portion of the coil pattern after finishing.
Figure 4:
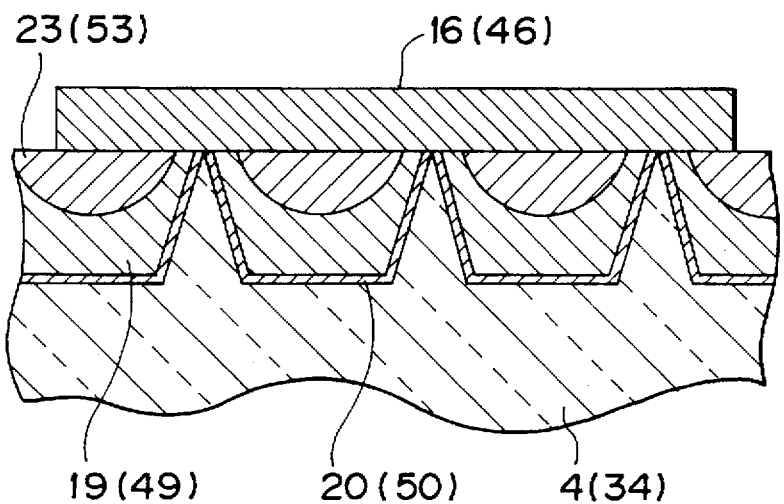
FIG. 4 is an enlarged sectional view showing the copper plating layer on the inner end portion of the coil pattern and a gold film thereon.

As shown in FIG. 2, when the copper plating layers 19 and 49 are formed on the base films 20 and 50, the copper plating layers 19 and 49 adopt shapes which follow the ridged surfaces formed by the projections 4a and 34a. The insulating protective films 23 and 53 are then filled into the concave portions of the copper,plating layers 19 and 49 and the surface is flattened, as shown in FIG. 3. Next, the gold films 16 and 46 are adhered to the copper plating layers 19 and 49 and patterned, as shown in FIG. 4. Irrespective of the depth through which the surface is cut during the above-mentioned surface-flattening process, there is always copper plating layer at the surface. This is because in the plating process the copper plating layer is formed on the sloping surfaces of the projections 4a.

In this way, at the inner end portions of the coil patterns, the copper plating layers are formed as if heaped up. Furthermore, this process consists only of the simple operations described above.

Next, a process for manufacturing the magnetic head of this preferred embodiment will be described.

Figure 9:
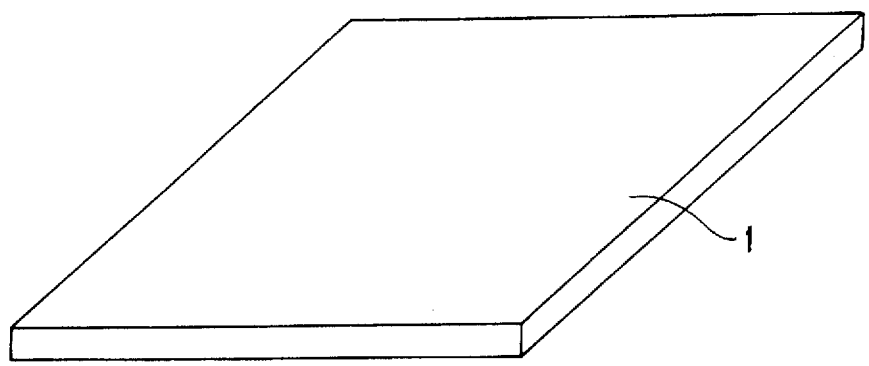
FIG. 9 is a perspective view of a substrate used in the manufacture of a head half.

First, as shown in FIG. 9, a substrate 1 of flat-plate form is prepared. The substrate 1 may be made of a magnetic material such as ferrite, but for example from the point of view of preventing crosstalk in multichannel applications and reducing the impedance of the magnetic head, it is preferably a non-magnetic material such as potassium titanate.

Of course, not only the above-mentioned potassium titanate but various other non-magnetic materials can be used; examples include calcium titanate, barium titanate, zirconium oxide (zirconia), alumina, alumina titanium carbide, $SiO_2$, MnO—NiO mixed sintered material, Zn ferrite, crystallized glass and high-hardness glass.

Figure 10:
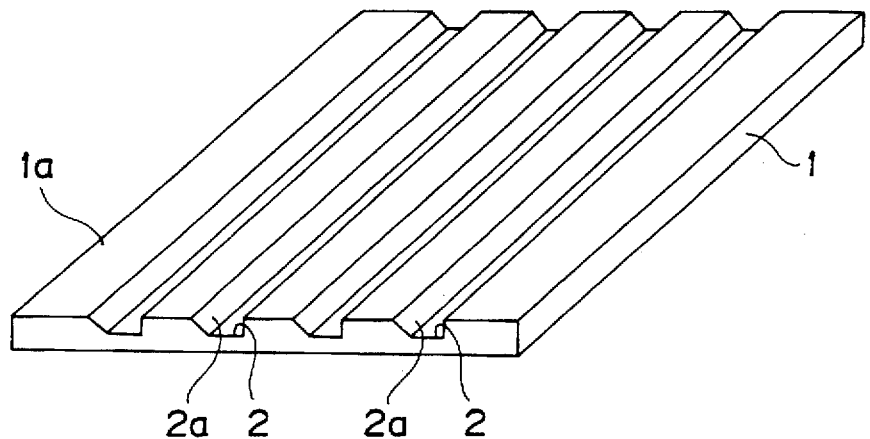
FIG. 10 is a perspective view illustrating a first groove-making step performed on the substrate.

Next, as shown in FIG. 10, a first groove-making process is carried out on the main surface 1a of the substrate 1. This groove-making is carried out so that a metallic magnetic film formed in a later step can be formed at an angle with respect to the main surface 1a, which is the magnetic gap forming surface, of the substrate 1. Accordingly, the first grooves 2 are formed in the depth direction with predetermined sloping surfaces 2a.

Figure 11:
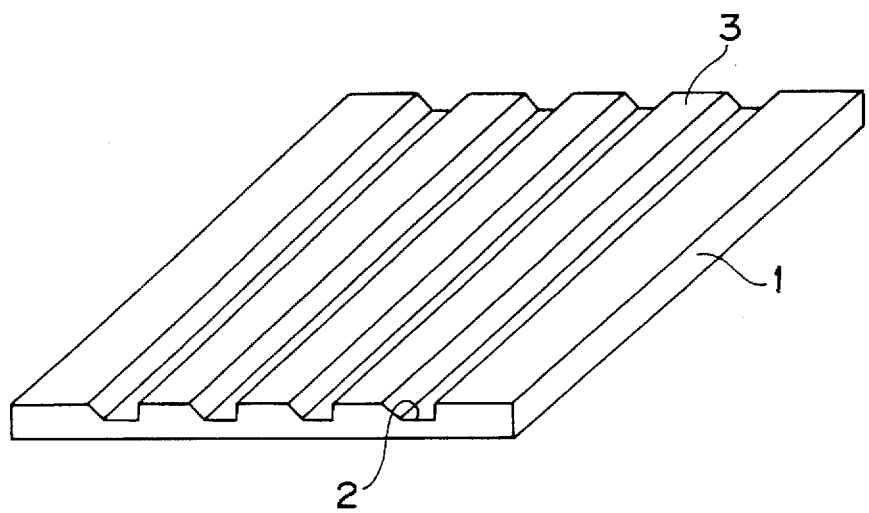
FIG. 11 is a perspective view illustrating a step of forming a metallic magnetic film.

After the above-mentioned groove-making is carried out, the metallic magnetic film 3 is formed over the entire main surface 1a of the substrate 1 including in the grooves 2 (and particularly on the above-mentioned sloping surfaces 2a), as shown in FIG. 11. Various thin film forming processes, such as vacuum deposition or sputtering or the like, can be used as the method of forming the metallic magnetic film 3.

Any material having a high saturation magnetic flux density and good soft magnetic characteristics can be used for the metallic magnetic film 3, and examples include crystalline alloys such as Fe—Al—Si alloys (especially Sendust), Fe—Al alloys, Fe—Si—Co alloys, Fe—Ga—Si alloys, Fe—Ga—Si—Ru alloys, Fe—Al—Ga alloys, Fe—Ga—Ge alloys, Fe—Si—Ge alloys, Fe—Co—Si—Sl alloys and Fe—Ni alloys, etc.

Alternatively, noncrystalline alloys such as metal-metalloid amorphous alloys exemplified by alloys consisting of one or more of the elements Fe, Co, Ni and one or more of the elements P, C, B, Si, or alloys having these as main components and including Al, Ge, Be, Sn, In, Mo, W, Ti, Mn, Cr, Zr, Hf or Nb, and metal-metal amorphous alloys having rare earth elements and transition metals such as Co, Hf, Zr as their main components can also be used.

Figure 12:
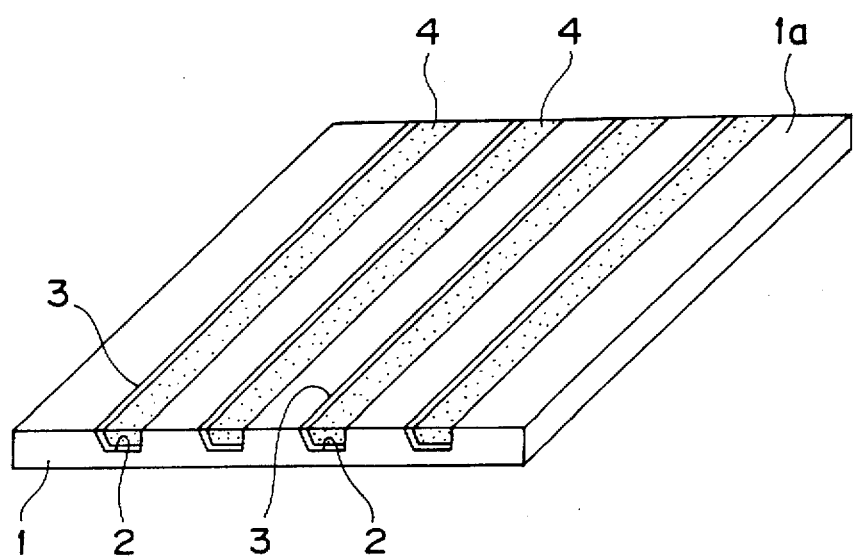
FIG. 12 is a perspective view illustrating a glass filling step.
Figure 13:
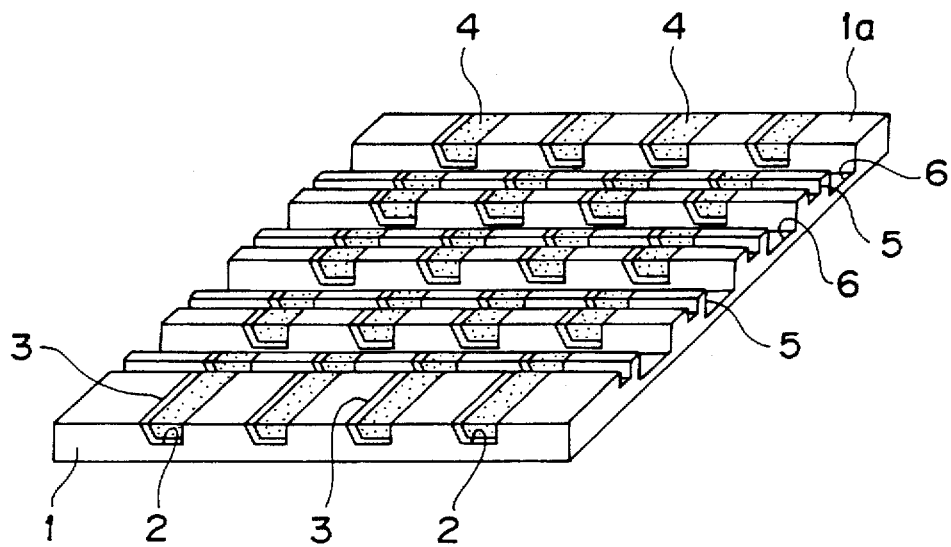
FIG. 13 is a perspective view illustrating second and third groove-making steps carried out on the substrate.

Next, after glass 4 is filled into the first grooves 2 formed in the substrate 1 and the surface is flattened, as shown in FIG. 12, second grooves 5 and third grooves 6 orthogonal to the first grooves 2 are formed by a cutting process, as shown in FIG. 13.

The second grooves 5 correspond to the coil grooves of an ordinary bulk-type magnetic head and are formed in order to set the front depth and the back depth of the metallic magnetic film 3 formed previously and to make the magnetic path constituted by the metallic magnetic film 3 a closed loop. The third grooves 6 are provided in order to remove the metallic magnetic film 3 which becomes unnecessary when the magnetic head has been finally assembled.

Figure 14:
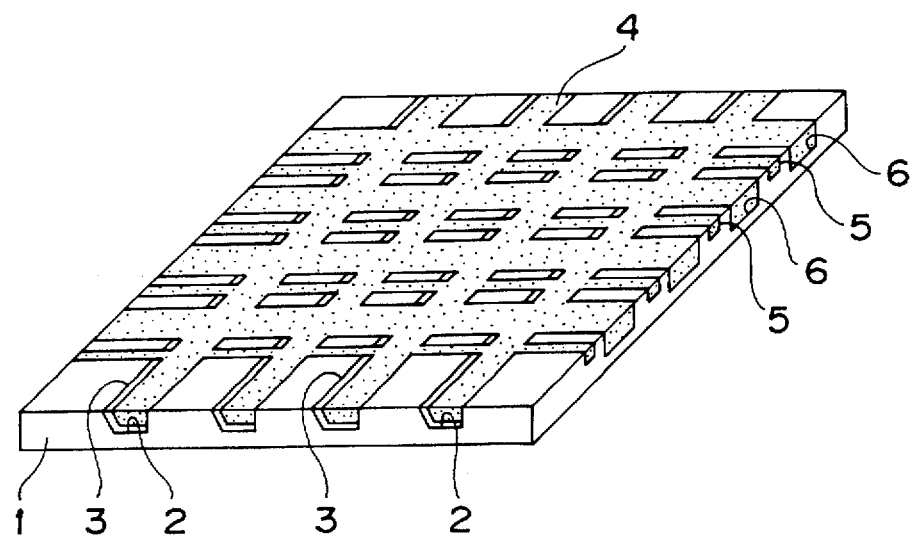
FIG. 14 is a perspective view illustrating a glass filing step.

Next, as shown in FIG. 14, glass 4 is filled into the second grooves 5 and the third grooves 6, and the main surface 1a is flattened.

Then, as shown in FIG. 15, fourth grooves 7 and fifth grooves 8 parallel to the first grooves 2 are formed by a cutting process. Here, the fourth grooves 7 are formed so that they are in contact with one edge of the metallic magnetic film 3 formed on the groove sloping surface 2a and control the abutting width of the metallic magnetic film 3, i.e. the track width. The fifth grooves 8 are provided to remove the unnecessary metallic magnetic film 3 lying on the bottom surfaces of the grooves 2.

Next, as shown in FIG. 16, glass 4 is filled into the fourth grooves 7 and the fifth grooves 8 and the surface is flattened.

A magnetic path portion constituted by the metallic magnetic film 3 is formed by the above steps. FIG. 17 shows a portion of FIG. 16 corresponding to an individual magnetic head (the portion XVII shown with broken lines) taken out and enlarged (and viewed from a different angle). A method of forming a coil in the region XVIII shown with broken lines in FIG. 17 will now be described.

FIG. 18, like FIG. 17, is an enlarged view of a part of the substrate 1 corresponding to an individual magnetic head; FIG. 18(a) is a plan view showing the rectangular region XVIII shown with broken lines in FIG. 17 further enlarged, and FIG. 18(b) shows sections along the broken lines in FIG. 18(a) (and similarly in the following drawings).

As shown in FIG. 18(a), the metallic magnetic film 3 fronts on the magnetic gap forming surface in two separate places; the centrally positioned portion is the back gap portion 3b and the portion separated from this back gap portion 3b by the groove 5 is the front gap portion 3a. Both portions are formed on the substrate 1 diagonally as shown in FIG. 18(b). The back gap portion 3b is surrounded by the glass 4 which was filled into the various grooves.

On this glass layer 4 a resist layer 61 is formed in approximate correspondence with the external shape of the coil by photolithography as shown in FIG. 19. At this time, the part of the resist layer 61 corresponding to the coil pattern inner end portion is provided with a plurality of slits 61a.

Then, as shown in FIG. 20, selective etching by ion milling is carried out to form the recess 10 corresponding to the external shape of the coil, and the photoresist 61 is washed off.

Here, because it is the glass 4 that is etched in the above-mentioned ion milling, the recess 10 is formed with good precision. Also, cross-sectionally triangular projections 4a are formed between the slits 61a in the resist layer as described above. The depth of the recess and the surface roughness of the bottom surface of the recess obtained after two hours of ion milling are shown in the table below for various kinds of substrate. Alternatively, multiple small diameter through holes can be provided instead of the slits in the resist layer. In this case, the cross-sectionally triangular projections will be island-shaped.

TABLE

| SUBSTRATE | DEPTH | ROUGHNESS |
|---|---|---|
| TiO—CaO | 2.0 μm | 50 nm |
| Monocrystalline MnZn Ferrite | 2.2 μm | 20 nm |
| SiO—PbO—BO Glass | 4.3 μm | 10 nm |

From the above table it can be seen that in order to form the coil portion recess 10 deeply and with good precision it is preferable that glass be used.

Besides the above-mentioned ion milling, chemical etching, reactive ion etching, powder beam etching and the like can be used as the method for forming the recess 10. Because these methods break away atoms of the portion being etched physically or chemically, when the portion being etched is polycrystalline the rate at which atoms are broken away differs according to crystal grain differences and it is difficult to form a flat recess 10; however, if the material is a noncrystalline material such as glass it is possible to form a flat recess 10. With a mechanical process it is difficult to form the space (recess) only where the space is required.

Next, as shown in FIG. 21, a base film which forms the base of the copper plating layer constituting the coil pattern is formed over the whole surface by sputtering. The base film 20 is made by forming an alumina film (0.2 μm thick), a chromium film (0.01 μm thick) and a copper film (0.2 μm thick) in this order, but this layer structure is not shown in the drawings.

A photoresist is then applied, and this is patterned as shown in FIG. 22 according to the coil pattern to be formed. In FIG. 22 reference number 62 denotes the patterned photoresist.

Next, copper plating is carried out using the photoresist 62 as a mask, a copper plating layer 19 of thickness approximately 3.5 μm is thereby formed, and the photoresist 62 is washed off, as shown in FIG. 23.

Then, as shown in FIG. 24, the base layer 20 on which there is no copper plating layer 19 is removed by ion milling, and the coil pattern 11 is thereby completed. At this time the copper plating layer 19 serves as a mask.

Next, as shown in FIG. 25, a photoresist 63 is applied, and this is patterned so that it remains on regions which are not to be etched.

The substrate is then immersed in ferric chloride solution, whereby unnecessary copper is removed by chemical etching and the coil pattern 11 comprising the copper plating layer 19 remains. Removal of the unnecessary portions of copper plating can be carried out by ion milling, reactive ion etching or powder beam etching or the like instead of chemical etching.

Next, an insulating protective material is applied, and as shown in FIG. 27 this is patterned so that it remains in the recess 10 and the coil pattern 11 is thereby protected by the insulating protective film 23. In this preferred embodiment a photoresist is used as the insulating protective material and hardened by heating to 200° to 400° C. to become the insulating protective film 23.

The surface is then flattened by polishing, and, as shown in FIG. 28, the copper plating layer on the inner end portion 11a of the coil pattern 11 is thereby exposed.

Next, a non-magnetic film 74 for forming the magnetic gap is formed by sputtering to a thickness of half the gap length, as shown in FIG. 29. The non-magnetic film 74 is formed in the order titanium, gold to a total thickness of 0.1 µm.

A photoresist is then applied to the non-magnetic film 74 and patterned so that a photoresist 64 remains on the inner end portion 11a of the coil pattern 11, the back gap portion 3b of the metallic magnetic film 3 and the region to the outside of the recess 10 (the region for forming the front gap), as shown in FIG. 30.

Ion milling is then carried out with the photoresist 64 as a mask, and unnecessary portions of the gold film (the non-magnetic film) are thereby removed. In this way, as shown in FIG. 31, the gold film 14 on the area to the outside of the recess 10 (including the front gap forming region), the gold film 15 on the back gap forming portion, the gold film 16 on the inner end portion 11a of the coil pattern 11, the gold film 17 on a portion of the terminal portion 12, and the gold film 18 on a portion of the terminal portion 13 remain.

Next, as shown in FIG. 32, the head half 9 made in the way described above and a head half 39 made by the same process are cut along the lines A—A, B—B and C—C, D—D respectively. This cutting is such that as mentioned above with reference to FIG. 7 the connecting portions 42 and 43 of the head half 39 are shorter than the terminal portions 12 and 13 of the head half 9.

Next, the head halves 9 and 39 cut to predetermined dimensions in FIG. 32 are fixed together as shown in FIG. 33 and thereby made into the unfinished magnetic head shown in FIG. 34. FIG. 34(a) is a perspective view of the unfinished magnetic head, and FIG. 34(b) is a sectional view on a line passing through the coil pattern inner end portion 11a. The above-mentioned fixing, as described earlier, is carried out by thermocompression at 250° to 300° C.

Unnecessary side edge portions of the unfinished magnetic head are then cut off, and the magnetic head shown in FIG. 35 is thereby obtained.

In the description of the steps illustrated in FIG. 18 to FIG. 34, a single head half was discussed; however, in practice, the above-described process is carried out on a platelike workpiece consisting of a set of multiple head halves of the kind shown in FIG. 16, and individual unfinished head halves are finally obtained by cutting this up.

As explained above, in a magnetic head according to this preferred embodiment, because as described above the inner end portion of the coil pattern is formed on a ridged surface formed by the projections in the glass layer, this end portion is higher than the rest of the coil pattern. As a result, the inner end portions of the pair of coil patterns can be easily and reliably connected together, and high productivity and high reliability are assured.

Also, in this magnetic head, because a recess of a shape corresponding to the shape of the coil pattern is formed around the back gap and the coil pattern is formed in this recess, no unnecessary opening (hole) is formed in the surface over which a magnetic recording medium slides and it is not necessary to fill any such opening with glass. Consequently, breakage of the thin film coil pattern and short-circuiting due to glass filling are eliminated.

Also, in this magnetic head manufacturing process, because, after the coil pattern is formed in the recess formed in advance by ion milling, flattening of the abutting surface (i.e. the magnetic gap forming surface) is carried out, good gap precision is secured.

Besides photoresist, stable insulating materials such as glass, oxides such as alumina and silica, and nitrides such as silicon nitride can be used as the material of the insulating protective film. When one of these is used, a film is formed by sputtering to a thickness of 6 to 8 µm and the surface is then flattened.

In an example for the purposes of comparison, the following changes were made: In the step of forming the recess described with reference to FIG. 19 and FIG. 20 in the above preferred embodiment, a recess of depth approximately 4.5 µm was formed by ion milling without slits being provided in the resist layer; in the step of forming the copper plating layer described with reference to FIG. 23 in the above preferred embodiment, a copper plating layer was formed to a thickness of approximately 5 µm; and in the step of patterning the gold film described with reference to FIG. 31 in the above preferred embodiment; unnecessary portions (a portion 0.5 to 1 µm thick of the upper part of the coil pattern including the insulating protective film and the inner end portion) were removed.

In this example, the insulating protective film on the coil pattern is removed and ceases to exist. Because of this, several further steps are required to again cover the coil pattern with an insulating protective film and to raise the inner end portion constituting the portion making the coil pattern electrically continuous with the other coil pattern.

In the above preferred embodiment, thin film coil patterns are formed on both of the substrates; however, it is possible to provide a coil pattern on one of the substrates only and provide an interconnector on the other substrate. That is, the inner end portion of the coil pattern and a terminal portion provided on this substrate (the terminal portion not connected on this substrate to the coin pattern) are electrically connected by an interconnector provided on the other substrate.

FIG. 36 is a plan view similar to FIG. 7 showing head halves constructed in this way, and FIG. 37, FIG. 38 and FIG. 39 are sectional views along the line E—E of FIG. 36 after the two head halves are fixed together.

In the example of FIG. 37 the head half 9 used in the above preferred embodiment is used as one of the head halves and a head half shown with the reference number 101 is used as the other head half.

In the head half 101 an L-shaped copper interconnector 104 is provided by electroplating inside a recess 103 in a glass layer 102, this is connected to the gold films 16 and 18 of the head half 9 by gold films 105 and 106, and the terminal portion 13 is connected to the inner end portion 11a of the coil pattern 11 through the interconnector 104. The interconnector 104 is covered by an insulating protective film 108. In FIG. 37, the reference number 107 denotes a gold film which together with the gold film 14 forms a magnetic gap.

In the example in FIG. 38, the head half 9 used in the above preferred embodiment is used as one of the head halves, and instead of the head half 101 in the example shown in FIG. 37 a head half shown with the reference number 111 is used as the other head half.

In the head half 111 no recess is provided in the glass layer 112, and the copper interconnector 114 on the glass layer 112 has no gold films thereon and directly connects with the gold films 16 and 18 on the head half 9. In FIG. 38, the reference numeral 114a denotes a copper plating layer for forming a magnetic gap together with the gold film 14. Otherwise this example is the same as the example shown in FIG. 37.

In the example shown in FIG. 39, head halves shown with the reference numbers 131 and 121 are used instead of the head halves 9 and 101 in FIG. 37.

The glass layer 132 of the head half 131 is not provided with any projections, the surface of the coil pattern 141 is made flat, and the coil pattern 141 is not covered by the insulating protective film 153.

A recess 123 is provided in the glass layer 122 of the head half 121, and projections 122a and 122b are formed in the glass layer 122 at positions facing connection portions of the inner end portion 141a of the coil pattern 141 and the terminal portion 148 of the head half 131 respectively. Consequently the portions of the copper interconnector 124 on the glass layer 122 at these locations project beyond the rest of the copper interconnector, and gold films 125 and 126 disposed here connect with the coil pattern inner end portion 141a and the terminal portion 148 respectively.

With the examples in FIG. 36 to 39 there is the advantage that when a small number of turns in the thin film coil will suffice the structure of one of the head halves can be simplified.

A preferred embodiment of the invention is described above, but various modifications can be made to this preferred embodiment based on the technological concept of the invention.

For example, suitable materials and shapes other than those described above can be used for the constituent parts of the magnetic head. Also, besides magnetic heads for VCRs, this invention can be applied to magnetic heads for audio and other uses.

In this invention, because at a base position corresponding to the electrical connection portion of the thin film coil exists between the pair of bases there are formed a plurality of surfaces sloping in directions intersecting with the surface on which the thin film coil is formed, the thin film coil or electrical connection portion connecting to the thin film coil is formed on a ridged surface formed by these sloping surfaces.

As a result, because the surface of the electrical connection portion is higher than the other conducting portions, and a conducting layer always exists at the surface after processing, the electrical connection is secure, there is no short-circuiting at places other than the electrical connection portion, and reliability is high.

It is not necessary to use any separate steps for making the surface of the electrical connection portion high, and the manufacture is simple.

What is claimed is:

1. A magnetic head, comprising:
 a pair of mating bases mated together and electrically interconnected via registering electrical interconnection terminals;
 a thin film coil formed on one of the bases, the coil having a coiled conductor portion, and an inner terminal at an end of said coiled conductor portion that serves as one of said registering electrical interconnection terminals; and
 at a base position on which said inner terminal is formed, a plurality of projections having sloping surfaces which intersect a plane defined by said coil, said projections supporting said inner terminal sufficiently above said plane to effect electrical interconnection with the other base, while maintaining spacing between said coil and other base, said inner terminal held by said projections to be elevated above said coiled conductor portion which is supported on said one of said bases.

2. The magnetic head according to claim 1, wherein each of the plurality of projections has an overall width from about 1 µm to about 10 µm, and wherein the projections are formed at a spacing between projections of from about 1 µm to about 10 µm.

3. The magnetic head according to claim 2 or 1, wherein regions of the thin film coil other than the electrical interconnection terminals are covered by an insulating film.

4. The magnetic head according to claim 2 or 1, wherein, other than the inner terminal, the thin film coil is disposed in a recess formed in the respective base.

5. The magnetic head according to claim 2 or 1, wherein a thin film coil is formed on each of the mated bases and these thin film coils are electrically connected to constitute one coil.

6. The magnetic head of claim 1, wherein each projection has an overall width that is greater than about 1 µm.

7. The magnetic head of claim 1, wherein the spacing between the projections is greater than about 1 µm.

8. The magnetic head of claim 1, wherein the projections are substantially triangular in cross section.

9. The magnetic head of claim 2 or 1, wherein the projections have a truncated triangular cross section.

10. The magnetic head of claim 1, wherein the sloping surfaces of the projections intersect the plane defined by the coil at angles from 30° to 90° with respect to the plane.

11. The magnetic head of claim 1, wherein the projections are substantially triangular in cross section with the sloping surfaces of the projections intersecting the plane defined by the coil at angles of between about 30° and 90° with respect to the plane of the coil.

12. A magnetic head, comprising:
 a pair of mating bases mated together and electrically interconnected via registering electrical interconnection terminals;
 a thin film coil formed on one of the bases, the coil having a coiled conductor portion, and an inner terminal at an end of said coiled conductor portion that serves as one of said registering electrical interconnection terminals; and
 at a base position on which said inner terminal is formed, a plurality of projections having sloping surfaces which intersect a plane defined by said coil, said projections supporting said inner terminal sufficiently above said plane to effect electrical interconnection with the other base, while maintaining spacing between said coil and other base said inner terminal held by said projections to be elevated above said coiled conductor portion which is supported on said one of said bases;
 wherein each of the plurality of projections has an overall width from about 1 µm to about 10 µm, and wherein the projections are formed at a spacing between projections of from about 1 µm to about 10 µm, and
 wherein the sloping surface of the projections intersect the plane defined by the coil at angle of between about 30° and 90°.

13. The magnetic head according to claim 12, wherein regions of the thin film coil other than the electrical interconnection terminals are covered by an insulating film.

14. The magnetic head according to claim 12, wherein, other than the inner terminal, the thin film coil is disposed in a recess formed in the respective base.

15. The magnetic head according to claim 12, wherein a thin film coil is formed on each of the mated bases and these thin film coils are electrically connected to constitute one coil.

16. The magnetic head according to claim 12, wherein the projections are substantially triangular in cross section.

17. The magnetic head according to claim 12, wherein the projections have truncated triangular cross sections.

18. A magnetic head, comprising:

a pair of mating bases mated together and electrically interconnected via registering electrical interconnection terminals;

a thin film coil formed on at least one of the bases, the coil having an inner terminal that serves as one of said registering electrical interconnection terminals; and at a base position on which said inner terminal is formed, a plurality of projections having surfaces which slope in directions intersecting a plane defined by said coil, said projections supporting said inner terminal sufficiently above said plane to effect electrical interconnection with the other registering electrical interconnection terminal of the other base, while maintaining spacing between said coil and other base, a inner terminal held by said projections to be elevated above said coiled conductor portion of said thin film coil which is supported on said one of said bases;

wherein each of the plurality of projections has an overall width from about 1 μm to about 10 μm, and wherein the projections are formed at a spacing between projections of from about 1 μm to about 10 μm, and wherein the projections are substantially triangular in cross section.

19. The magnetic head according to claim 18, wherein regions of the thin film coil other than the electrical interconnection terminals are covered by an insulating film.

20. The magnetic head according to claim 18, wherein, other than the inner terminal, the thin film coil is disposed in a recess formed in the respective base.

21. The magnetic head according to claim 18, wherein a thin film coil is formed on each of the mated bases and these thin film coils are electrically connected to constitute one coil.

22. The magnetic head according to claim 18, wherein the sloping surfaces of the projections intersect the plane defined by the coil at angles of between about 30° and 90° with respect to the plane.

23. The magnetic head according to claim 18 or 22, wherein the projections have truncated triangular cross sections.

* * * * *